United States Patent [19]

Tagawa et al.

[11] Patent Number: 5,494,990
[45] Date of Patent: Feb. 27, 1996

[54] THERMOPLASTIC POLYURETHANE RESIN HAVING BROAD RUBBERY-STATE REGION AND PROCESS FOR PRODUCING THE SAME

[75] Inventors: Hiroyuki Tagawa, Tokyo; Kazuaki Okabe, Kanagawa, both of Japan

[73] Assignee: Hodogaya Chemical Co., Ltd., Kawasaki, Japan

[21] Appl. No.: 415,342

[22] Filed: Apr. 3, 1995

[30] Foreign Application Priority Data

| Apr. 4, 1994 | [JP] | Japan | 6-087256 |
| May 24, 1994 | [JP] | Japan | 6-132459 |
| Sep. 13, 1994 | [JP] | Japan | 6-243465 |

[51] Int. Cl.$^6$ ................................. C08G 18/28
[52] U.S. Cl. .................. 528/73; 528/76; 528/79
[58] Field of Search ..................... 528/73, 76, 79

[56] References Cited

U.S. PATENT DOCUMENTS

| 3,940,369 | 2/1976 | Yukuta et al. | 528/73 |
| 4,477,624 | 10/1984 | Waki | 528/73 |
| 4,542,165 | 9/1985 | Kumata et al. | 528/73 |
| 5,079,326 | 1/1992 | Suzuki et al. | 528/73 |
| 5,260,361 | 11/1993 | Fukushima et al. | 528/73 |
| 5,321,101 | 6/1994 | Suzuki et al. | 528/73 |

FOREIGN PATENT DOCUMENTS

| 3-177413 | 8/1991 | Japan . | |

*Primary Examiner*—Morton Foelak
*Attorney, Agent, or Firm*—Oblon, Spivak, McClelland, Maier & Neustadt

[57] ABSTRACT

Disclosed is a polyurethane resin having a broad rubbery-state region which has a number-average molecular weight of from 30,000 to 500,000 and comprises repeating units (A) represented by formula (I):

$$-CONH\text{-}X\text{-}NHCOO\text{-}Y\text{-}O- \qquad (I)$$

wherein X represents the divalent residue formed by removing the isocyanate groups from a specific aromatic diisocyanate and Y represents the divalent residue formed by removing the hydroxyl groups from a poly(alkylene ether) diol whose main chain is made up of the group represented by $-CH_2CH_2CH_2CH_2O-$ and a group represented by $-CHR_1CHR_2CHR_3CHR_4O-$ where one of $R_1, R_2, R_3,$ and $R_4$ is a lower alkyl group and the remaining three each is a hydrogen atom, and which has a number-average molecular weight of from 500 to 10,000, and repeating units (B) represented by formula (II):

$$-CONH\text{-}X\text{-}NHCOO\text{-}Z\text{-}O- \qquad (II)$$

wherein Z represents the divalent residue formed by removing the hydroxyl groups from 3,9-bis(1,1-dimethyl-2-hydroxyethyl)-2,4,8,10-tetraoxaspiro[5,5]undecane, the repeating units (A) and (B) being bonded together in a random sequence, with the proportion of (A)/(B) being from 0.1 to 2.0.

4 Claims, 2 Drawing Sheets

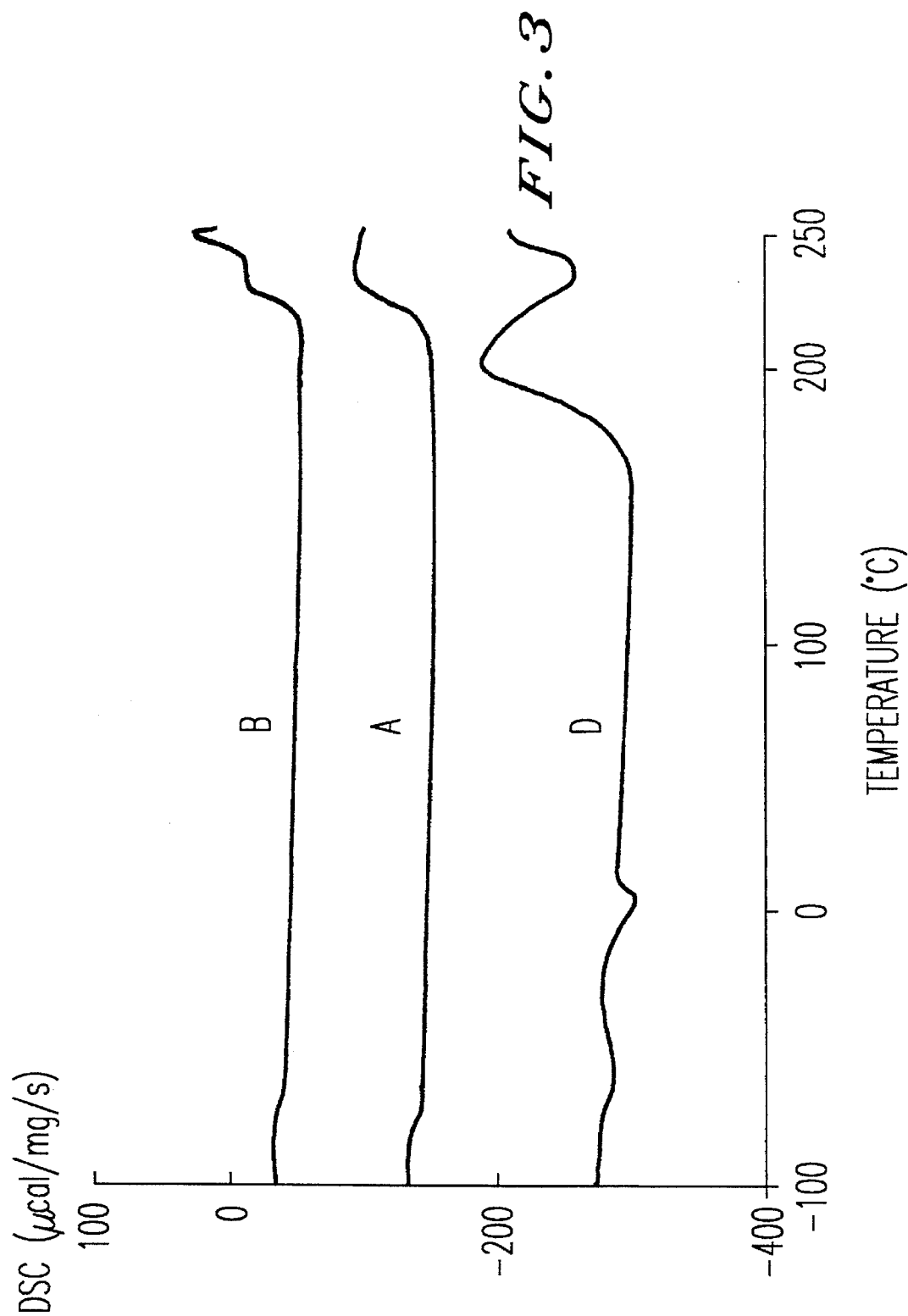

THERMOPLASTIC POLYURETHANE RESIN HAVING BROAD RUBBERY-STATE REGION AND PROCESS FOR PRODUCING THE SAME

FIELD OF THE INVENTION

The present invention relates to a novel thermoplastic polyurethane resin, more particularly a novel thermoplastic polyurethane resin having a broad rubbery-state region, and a process for producing the same.

BACKGROUND OF THE INVENTION

Thermoplastic polyurethanes have been long known, and are used in a wide range of fields including elastomer fibers, elastomers, artificial leathers, and coating compositions. In general, thermoplastic polyurethane resins are obtained by reacting either a polyether diol, such as poly(propylene glycol) having a molecular weight of from 500 to 4,000, a mixed polypropylene-polyethylene glycol or poly(tetramethylene ether glycol, or a polyester glycol, such as poly(butylene adipate) or poly(caprolactone glycol)), an organic diisocyanate and a chain extender such as a short-chain glycol and a short-chain diamine. Examples of the organic diisocyanate include tolylene diisocyanate (TDI), 4,4'-diphenylmethane diisocyanate (MDI), and 1,6-hexane diisocyanate (HDI). Examples of the short-chain glycol and short-chain diamine chain extenders include 1,4-butanediol, 1,6-hexanediol, ethylenediamine, propylenediamine, 4,4'-diaminodiphenylmethane, and methylenebismonochloroaniline. In these thermoplastic polyurethane resins, the long-chain diol provides soft segments, while the segments formed from the organic diisocyanate and the short-chain glycol and short-chain diamine chain extenders serve as hard segments. As a result, the resins have a microscopically phase-separated structure to exhibit rubber elasticity. By changing the kinds and proportions of the long-chain diol, organic diisocyanate, and chain extenders used, various rubbery properties can be obtained according to use purposes and various desired performances.

In recent years, however, higher functions are desired increasingly with the expansion of the range of applications of thermoplastic polyurethane resins. Especially strongly desired is a thermoplastic polyurethane having excellent heat resistance and excellent low-temperature properties, i.e., a thermoplastic polyurethane resin having a broad rubbery-state region. Conventional thermoplastic polyurethanes lose their elasticity at around 120° C. Generally employed for improving heat resistance are a technique of increasing the proportion of a diisocyanate and a chain extender and a technique of using as an additional chain extender a polyol or a polyamine each having a functionality of 3 or higher. Although these techniques are effective in improving heat resistance, the polyurethane resins obtained not only have reduced rubber elasticity but also tend to lose thermoplasticity. On the other hand, a thermoplastic polyurethane having rubber elasticity at temperatures up to around 200° C. is disclosed in JP-A-3-177413, which polyurethane is obtained using as a chain extender a specific diol compound containing a spiro ring. (The term "JP-A" as used herein means an "unexamined published Japanese patent application.") This prior art polyurethane has improved heat resistance and is suitable for use in applications where heat resistance is required. However, the proposed polyurethane cannot be an effective elastomer at a temperature of 0° C. and lower because it has an increased modulus of elasticity at such a low temperature.

SUMMARY OF THE INVENTION

An object of the present invention is to provide a thermoplastic polyurethane resin having excellent heat resistance and excellent low-temperature properties, i.e., a thermoplastic polyurethane resin having a broad rubbery-state region.

As a result of extensive studies made by the present inventors, it has been found that the above object is accomplished by a polyurethane resin which is produced from a specific low-melting poly(alkylene ether) diol having in the molecule an alkylene chain having a lower alkyl side chain, an organic diisocyanate, and a specific dihydroxy compound containing a spiro ring. The present invention has been achieved based on this finding.

The present invention provides:

1. A polyurethane resin having a broad rubbery-state region which has a number-average molecular weight of from 30,000 to 500,000 and comprises repeating units (A) represented by general formula (I):

—CONH-X-NHCOO-Y-O—     (I)

(wherein X represents the divalent residue formed by removing the isocyanate groups from an aromatic diisocyanate selected from the group consisting of p-phenylene diisocyanate, 2,4-toluene diisocyanate, 2,6-toluene diisocyanate, 4,4'-diphenylmethane diisocyanate, 1,5-naphthalene diisocyanate, and 3,3'-dimethyldiphenyl 4,4-diisocyanate, and Y represents the divalent residue formed by removing the hydroxyl groups from a poly(alkylene ether) diol whose main chain is made up of the group represented by —CH$_2$CH$_2$CH$_2$CH$_2$O— and a group represented by —CHR$_1$CHR$_2$CHR$_3$CHR$_4$O— (wherein one of R$_1$, R$_2$, R$_3$, and R$_4$ is a lower alkyl group and the remaining three each is a hydrogen atom) and which has a number-average molecular weight of from 500 to 10,000) and repeating units (B) represented by general formula (II):

CONH-X-NHCOO-Z-O—     (II)

(wherein X represents the divalent residue formed by removing the isocyanate groups from an aromatic diisocyanate selected from the group consisting of p-phenylene diisocyanate, 2,4-toluene diisocyanate, 2,6-toluene diisocyanate, 4,4'-diphenylmethane diisocyanate, 1,5-naphthalene diisocyanate, and 3,3'-dimethyldiphenyl 4,4-diisocyanate, and Z represents the divalent residue formed by removing the hydroxyl groups from 3,9-bis(1,1-dimethyl-2-hydroxyethyl)-2,4,8,10-tetraoxaspiro[5,5]undecane), the repeating units (A) and (B) being bonded together in a random sequence, with the proportion of (A)/(B) being from 0.1 to 2.0;

2. The polyurethane resin having a broad rubbery-state region as described in 1 above, which comprises repeating units (A) represented by general formula (I):

—CONH-X-NHCOO-Y-O—     (I)

(wherein X represents the divalent residue formed by removing the isocyanate groups from 4,4'-diphenylmethane diisocyanate and Y represents the divalent residue formed by removing the hydroxyl groups from a poly(alkylene ether) diol whose main chain is made up of the group represented by —CH$_2$CH$_2$CH$_2$CH$_2$O— and a group represented by —CH$_2$CHR$_2$CHR$_3$CH$_2$O— (wherein either of R$_2$ and R$_3$ is a methyl group and the remaining one is a hydrogen atom) and which has a number-average molecular weight of 500 to 10,000) and repeating units (B) represented by general formula (II):

$$-CONH-X-NHCOO-Z-O- \qquad (II)$$

wherein X represents the divalent residue formed by removing the isocyanate groups from 4,4'-diphenylmethane diisocyanate and Z represents the divalent residue formed by removing the hydroxyl groups from 3,9-bis(1,1-dimethyl-2-hydroxyethyl) -2,4,8,10-tetraoxaspiro[5,5]undecane);

3. A process for producing the polyurethane resin as described in 1 above, which comprises reacting an aromatic diisocyanate selected from the group consisting of p-phenylene diisocyanate, 2,4-toluene diisocyanate, 2,6-toluene diisocyanate, 4,4'-diphenylmethane diisocyanate, 1,5-naphthalene diisocyanate, and 3,3'-dimethyldiphenyl 4,4-diisocyanate with a poly(alkylene ether) diol whose main chain is made up of the group represented by —CH$_2$CH$_2$CH$_2$CH$_2$O— and a group represented by —CHR$_1$CHR$_2$CHR$_3$CHR$_4$ O— (wherein one of R$_1$, R$_2$, R$_3$, and R$_4$ is a lower alkyl group and the remaining three each is a hydrogen atom) and which has a number-average molecular weight of from 500 to 10,000 in a molar ratio (r) of (1.5–10.0):1 in an inert atmosphere either in an inert solvent or without a solvent at a temperature of from room temperature (e.g., about 20° C.) to 130° C. to form a partial prepolymer represented by general formula (III):

$$OCN-(-X-NHCOO-Y-O-CONH-)_p-X-NCO \qquad (III)$$

and general formula (IV):

$$q \times (OCN-X-NCO) \qquad (IV)$$

(wherein p and q each is a positive number, provided that (p+q+1)/p=r, X represents the divalent residue formed by removing the isocyanate groups from an aromatic diisocyanate selected from the group consisting of p-phenylene diisocyanate, 2,4-toluene diisocyanate, 2,6-toluene diisocyanate, 4,4'-diphenylmethane diisocyanate, 1,5-naphthalene diisocyanate, and 3,3'-dimethyldiphenyl 4,4-diisocyanate, and Y represents the divalent residue formed by removing the hydroxyl groups from a poly(alkylene ether) diol whose main chain is made up of the group represented by —CH$_2$CH$_2$CH$_2$CH$_2$O— and a group represented by —CHR$_1$CHR$_2$CHR$_3$CHR$_4$O— (wherein one of R$_1$, R$_2$, R$_3$, and R$_4$ is a lower alkyl group and the remaining three each is a hydrogen atom) and which has a number-average molecular weight of from 500 to 10,000), and then adding 3,9-bis(1,1-dimethyl-2-hydroxyethyl)- 2,4,8,10-tetraoxaspiro[5,5]undecane to the resulting reaction system in an amount of from 0.90 to 1.10 mol per mol of the partial prepolymer composed of the components represented by general formulae (III) and (IV) to similarly conduct a polyaddition reaction in an inert atmosphere; and 4. A process for producing a polyurethane resin as described in 1 above, which comprises polyaddition reacting (a) an aromatic diisocyanate selected from the group consisting of p-phenylene diisocyanate, 2,4-toluene diisocyanate, 2,6-toluene diisocyanate, 4,4'-diphenylmethane diisocyanate, 1,5-naphthalene diisocyanate, and 3,3'-dimethyldiphenyl 4,4-diisocyanate with (b) a poly(alkylene ether) diol whose main chain is made up of the group represented by —CH$_2$CH$_2$CH$_2$CH$_2$O— and a group represented by —CHR$_2$CHR$_2$CHR$_3$CHR$_4$O— (wherein one of R$_1$, R$_2$, R$_3$, and R$_4$ is a lower alkyl group and the remaining three each is a hydrogen atom) and which has a number-average molecular weight of from 500 to 10,000 and (c) 3,9-bis(1,1 -dimethyl-2-hydroxyethyl)-2,4,8,10-tetraoxaspiro[5,5]undecane in an (a)/{(b)+(c)} molar ratio of from 0.90 to 1.10 in an inert atmosphere either at a temperature of from room temperature to 130° C. in an inert solvent or at a temperature of from 180° to 230° C. without a solvent.

BRIEF DESCRIPTION OF THE DRAWINGS

A: PTGL 2000/MDI/SPG: prepolymer process
B: PTGL 3000/MDI/SPG: prepolymer process
C: PTGL 2000/MDI/SPG: one-shot process

D: PTG 2000/MDI/SPG: prepolymer process
E: PTG 3000/MDI/SPG: prepolymer process
F: PTG 2000/MDI/1.4 BD: prepolymer process FIG. 3 shows DSC data for ether-type polyurethanes according to the present invention and for a conventional ether-type polyurethane (Comparative Example).

Figure 1:
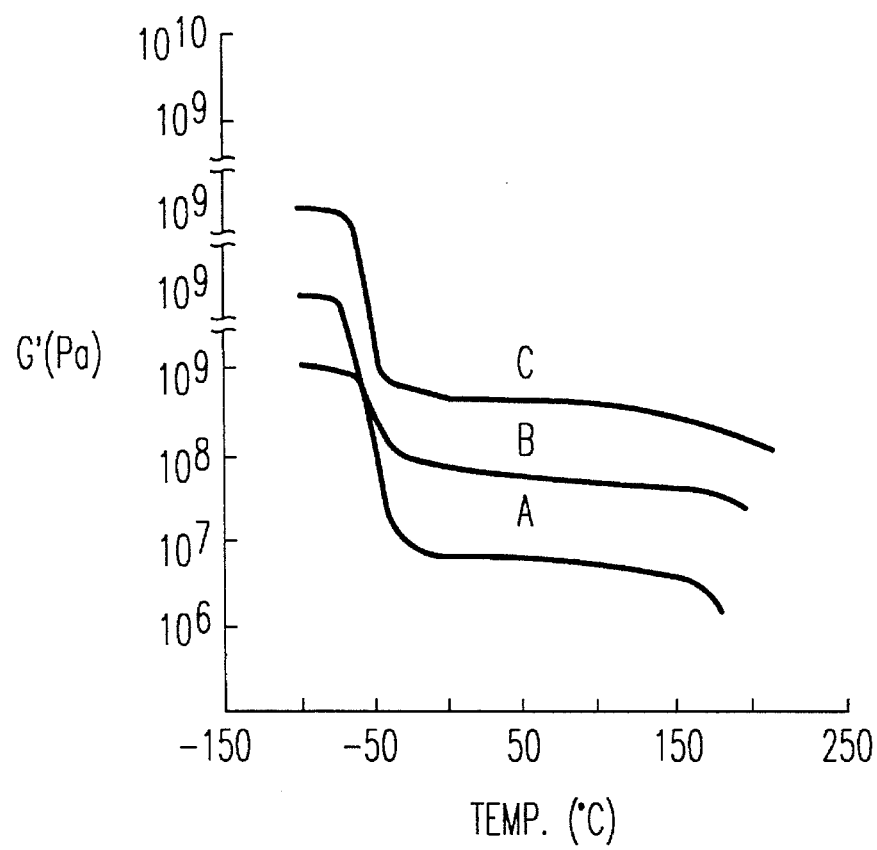
FIG. 1 shows graphs obtained by plotting the dynamic storage moduli of ether-type polyurethanes according to the present invention against temperature.

A: PTGL 2000/MDI/SPG: prepolymer process
B: PTGL 3000/MDI/SPG: prepolymer process
D: PTG 2000/MDI/SPG: prepolymer process

DETAILED DESCRIPTION OF THE INVENTION

The polyurethane resin of the present invention is thermoplastic, and is capable of being molded by thermoforming with ordinary molding machines such as an injection molding machine and an extrusion molding machine. This polyurethane is an elastomer which shows high rubber elasticity even at low temperatures around –50° C.

This polyurethane resin undergoes substantially no change in dynamic storage modulus in the temperature range of from a temperature as low as –50° C. to a temperature as high as about 170° C. Namely, the resin is an elastomer having a constant modulus of elasticity over a wide temperature range.

The above-described polyurethane resin of the present invention can be produced by either a prepolymer process or a one-short process.

In the prepolymer process, an aromatic diisocyanate compound is first reacted with a poly(alkylene ether) diol to produce an isocyanate-terminated prepolymer. This prepolymer is then reacted with 3,9-bis(1,1-dimethyl-2-hydroxyethyl)- 2,4,8,10-tetraoxaspiro[5,5]undecane by polyaddition reaction to obtain the desired polyurethane resin.

For yielding the isocyanate-terminated prepolymer in the prepolymer-forming reaction in the prepolymer process, it is necessary to carry out the reaction in a diisocyanate/diol molar ratio (r) of (1.5–10.0):1, preferably (1.5–5.0):1. This ratio (r) is suitably selected according to the desired properties and performances of the polyurethane resin to be obtained.

It should be noted that since isocyanate compounds may be partly deactivated by water during storage and/or in use as is well known, an isocyanate is generally used for the reaction in slight excess so as to compensate the loss. In general, an isocyanate is used in an amount larger than its stoichiometric amount by about 1 to 5 mol % thereof.

This reaction may be conducted usually at a temperature of from room temperature to about 130° C., preferably from about 50° C. to 100° C. An organometallic catalyst such as dibutyltin dilaurate may be used to accelerate the reaction.

The diisocyanate compound that can be used for this prepolymer-forming reaction is represented by the following general formula (V).

$$OCN\text{-}X\text{-}NCO \quad (V)$$

Examples of this diisocyanate compound include p-phenylene diisocyanate, toluene 2,4-diisocyanate, toluene 2,6-diisocyanate, 4,4'-diphenylmethane diisocyanate, 1,5-naphthalene diisocyanate, and 3,3'-dimethyldiphenyl 4,4'-diisocyanate. These diisocyanate compounds may be used for the reaction as a mixture of two or more thereof. A preferred diisocyanate compound is 4,4'-diphenylmethane diisocyanate (MDI).

The poly(alkylene ether) diol used in reaction with the diisocyanate compound for forming an isocyanate-terminated prepolymer in the present invention is a diol whose main chain is made up of the group represented by $-CH_2CH_2CH_2CH_2O-$ and a group represented by $-CHR_1CHR_2CHR_3CHR_4O-$ (wherein one of $R_1$, $R_2$, $R_3$, and $R_4$ is a lower alkyl group (having 1 to 4 carbon atoms) and the remaining three each is a hydrogen atom), these structural units being bonded through random polymerization. An example of this poly(alkylene ether) diol is a random copoly(alkylene ether) diol obtained by copolymerizing a mixture of tetrahydrofuran and 3-methyltetrahydrofuran or 2-methyltetrahydrofuran in a molar ratio of from 85/15 to 20/80 at a temperature of usually from 0° C. to 50° C. using a strong acid capable of inducing the ring opening of THF (tetrahydrofuran), such as a chlorosulfonic acid, a fluorosulfonic acid, or perchloric acid.

The group represented by $-CHR_1CHR_2CHR_3CHR_4O-$ in the residue represented by Y in general formula (I) described above is a group derived from 3-methyltetrahydrofuran, 2-methyltetrahydrofuran, or the like, and the content of this group in the poly(alkylene ether) diol for use in the present invention is preferably from 5 to 50% by weight.

If the content of that group is lower than 5% by weight, there is a possibility that the poly(alkylene ether) diol has increased crystallinity and the polyurethane resin obtained using this poly(alkylene ether) diol has an increased storage modulus at temperatures of 0° C. and lower, which property is unsuited for the intended purpose. If it is higher than 50% by weight, there is a possibility that the polyurethane resin obtained has an increased glass transition point and hence shows impaired low-temperature properties.

The number-average molecular weight of the poly(alkylene ether) diol used in the present invention is from 500 to 10,000. If the molecular weight thereof is below 500 or above 10,000, it is impossible to obtain a polyurethane elastomer having desirable rubber elasticity as well as low-temperature properties and heat resistance. The preferred molecular weight of the poly(alkylene ether) diol is approximately from 800 to 7,000.

According to the present invention, the reaction of the above-described diisocyanate compound with the above-described poly(alkylene ether) diol yields an isocyanate-terminated partial prepolymer (a compound in which a prepolymer and the diisocyanate coexist) which is represented by general formula (III):

$$OCN\text{-}(\text{-}X\text{-}NHCOO\text{-}Y\text{-}O\text{-}CONH\text{-})_p\text{-}X\text{-}NCO \quad (III)$$

and general formula (IV):

$$q\times(OCN\text{-}X\text{-}NCO) \quad (IV)$$

(wherein p, q, and X are the same as defined above and Y represents the divalent residue formed by removing the terminal hydroxyl groups from the poly(alkylene ether) diol used].

The thus-obtained isocyanate-terminated partial prepolymer composed of the components represented by general formulae (III) and (IV) is then subjected to a polyaddition reaction with 3,9-bis(1,1-dimethyl-2-hydroxyethyl)-2,4,8,10-tetraoxaspiro[5,5]undecane. This polyaddition reaction may be carried out by adding 3,9-bis(1,1-dimethyl-2-hydroxyethyl)- 2,4,8,10-tetraoxaspiro[5,5]undecane to the reaction mixture resulting from the partial-prepolymer-forming reaction in an amount of from 0.90 to 1.10 mol, preferably from 0.95 to 1.05 mol, per mol of the partial prepolymer formed. The molar quantity of the partial prepolymer can be obtained as a half of the molar quantity of an isocyanate group contained in the partial prepolymer, since the compound of formula (III) or (IV) each has two isocyanate groups.

This polyaddition reaction may be generally carried out in the range of from room temperature to about 130° C., i.e., in the same temperature range as the prepolymer synthesis. Conducting the reaction in this temperature range usually for approximately from 4 to 10 hours yields a polyurethane elastomer having the desired molecular weight. The preferred reaction temperature is approximately from 50° to 100° C.

Even without a catalyst, this polyaddition reaction proceeds sufficiently.

If desired, however, the reaction may be carried out in the presence of a catalyst. A catalyst ordinarily employed for the reaction of an isocyanate-terminated prepolymer with a diol chain extender in polyurethane synthesis may be used for the above polyaddition reaction in an amount of the ordinary range.

Examples of such a catalyst include an organometallic catalyst such as dibutyltin dilaurate and an amine catalyst such as triethylamine.

In the above-described prepolymer process of the present invention, the two reactions may be conducted either in an inert solvent or without a solvent. In the case of carrying out the prepolymer process in an inert solvent, the concentration of the reactants is generally about from 10 to 50 wt/vol % (i.e., 10 to 50 g of the reactants per 100 ml of the solvent), preferably about from 20 to 40 wt/vol %. Preferred inert solvents include toluene, anisole, dimethylformamide, dimethylacetamide, and dimethyl sulfoxide. The two reactions both are performed in an inert atmosphere. Generally usable inert atmospheres include rare gases such as neon and argon and nitrogen gas, but nitrogen gas is generally used from the standpoint of economy.

For producing a thermoplastic polyurethane resin having both satisfactory heat resistance and satisfactory low-temperature properties in the present invention, it is essential to use a random copoly(alkylene ether) diol made up of the group represented by $-CH_2CH_2CH_2CH_2O-$ and a group represented by $-CHR_1CHR_2CHR_2CHR_4O-$ (wherein one of $R_1$, $R_2$, $R_3$, and $R_4$ is a lower alkyl group and the remaining three each is a hydrogen atom) and 3,9-bis(1,1-dimethyl-2-hydroxyethyl)- 2,4,8,10-tetraoxaspiro[5,5]undecane.

Investigations made in relation to the present invention have revealed that any ingredients other than those described above, e.g., a combination of a short-chain glycol for general use in producing thermoplastic polyurethane resins (such as 1,4-butanediol, 1,6-hexanediol, ethylene glycol or diethylene glycol) and a long-chain diol for use in polyurethane production (such as poly(propylene glycol) or poly(tetramethylene ether glycol)), cannot yield a resin which combines low-temperature properties and heat resistance like the polyurethane resin of the present invention.

On the other hand, in the one-short process, the aromatic diisocyanate compound and poly(alkylene ether) diol according to the present invention and 3,9-bis(1,1-dimethyl-2 -hydroxyethyl)-2,4,8,10-tetraoxaspiro[5,5]undecane are mixed together simultaneously to cause the reactants to undergo a polyaddition reaction. Thus, the desired polyurethane resin is obtained.

In this process, the diisocyanate ingredient (a), the poly-(alkylene ether) diol (b), and 3,9-bis(1,1-dimethyl-2 -hydroxyethyl)-2,4,8,10-tetraoxaspiro[5,5]undecane(c) are mixed in such a proportion that the molar ratio of (a)/{(b)+(c)} is in the range of from 0.90 to 1.10, preferably from 0.95 to 1.05.

In the case of conducting the one-shot polyaddition reaction in an inert solvent, almost the same atmosphere, temperature, and concentration as in the prepolymer process may be used, and a catalyst may be added, if desired. In the case of carrying out the one-shot process without a solvent, the reaction is conducted at a temperature not lower than the softening point of the polyurethane resin of the invention to be obtained and not higher than the decomposition temperature of the urethane group, i.e., in the range of from 180° to 230° C., with powerful stirring. This reaction may be carried out in the absence of a catalyst, and if desired, a catalyst may be used.

As 3,9-bis(1,1-dimethyl-2-hydroxyethyl)-2,4,8,10-tetraoxaspiro[ 5,5]undecane, a commercially available product such as Spiroglycol produced by Koei Chemical Company, Ltd., Japan, may be used.

The thus-produced polyurethane of the present invention is a polyurethane resin which has a number-average molecular weight of from 30,000 to 500,000 and comprises repeating units (A) represented by general formula (I):

—CONH-X-NHCOO-Y-O—    (I)

(wherein X and Y are as defined hereinabove) and repeating units (B) represented by general formula (II):

—CONH-X-NHCOO-Z-O—    (II)

(wherein X and Z are as defined hereinabove), the units (A) and (B) being arranged in a random sequence, with the proportion of (A)/(B) being from 0.1 to 2.0.

The proportion of (A)/(B) as used herein means the proportion of the number of a repeating unit (A) to the number of a repeating unit (B) contained in the polyurethane resin, which can be obtained taking the amount of ingredients charged in the preparation of the polyurethane resin into account.

If the proportion of repeating units (A) to (B) is smaller than 0.1, the polyurethane resin has a reduced proportion of soft segments, so that it not only is impaired in processability, including moldability and film-forming property, but also has an exceedingly elevated modulus of elasticity. Thus, satisfactory elastomers cannot be obtained.

If the proportion of repeating units (A) to (B) exceeds 2.0, not only reduced modulus of elasticity results but also tackiness appears. Thus, elastomers suitable for practical use cannot be obtained.

The polyurethane resin of the present invention has an number-average molecular weight of from 30,000 to 500,000, preferably from 100,000 to 300,000. If the molecular weight thereof is lower than 30,000, satisfactory elastomers cannot be obtained because mechanical properties are impaired and plastic deformation occurs.

Molecular weights thereof higher than 500,000 are unsuitable for practical use, because such high molecular weights pose problems concerning processing although preferred elastomer properties are obtained.

This polyurethane resin is thermoplastic as described above and can be easily molded by an ordinary thermoforming method, e.g., injection molding, extrusion molding, or compression molding. The molding temperature is generally from 200° to 250° C. The resin also has a high level of modulus of elasticity. This high modulus of elasticity (dynamic storage modulus) is kept almost constant over a wide temperature range, e.g., from about −50° C. to about +170° C. The stable retention of a modulus of elasticity over the wide range of from such a low temperature to a high temperature is attributable to the fact that a microscopically phase-separated structure, i.e., a sea-island structure, composed of noncrystalline soft segments consisting of specific random copoly(alkylene ether) diol moieties and crystalline hard segments which are the segments formed by the reaction of the diisocyanate and 3,9-bis(1,1 -dimethyl-2-hydroxyethyl)-2,4,8,10-tetraoxaspiro[5,5]undecane is maintained in the polyurethane elastomer of the present invention over the wide range of from a low to a high temperature.

The urethane resin of the present invention has been found to be superior also in heat resistance to urethane resins obtained from poly(tetramethylene ether glycol), a diisocyanate, and 3,9-bis(1,1-dimethyl-2-hydroxyethyl)- 2,4,8,10-tetraoxaspiro[5,5]undecane (results of DSC). It is thought that due to the use of the specific noncrystalline random copoly(alkylene ether) diol, the microscopic phase separation is enhanced further, resulting in an increased melting point, that is, improved heat resistance.

EXAMPLES

The present invention will be illustrated below by reference to the following Examples.

However, the present invention should not, of course, be construed as being limited to these Examples.

Hereinafter, the random copoly(alkylene ether) diol obtained from tetrahydrofuranand 3-methyltetrahydrofuran, for use in this invention, is abbreviated as "PTG-L."

The group (—CH$_2$CH(CH$_3$)CH$_2$CH$_2$O— or —CH$_2$CH$_2$CH(CH$_3$)CH$_2$O—) derived from 3-methyltetrahydrofuran is referred to as a "3-methyltetrahydrofuran unit."

3,9-Bis(1,1-dimethyl-2-hydroxyethyl)-2,4,8,10-tetraoxaspiro[ 5,5]undecane is abbreviated as "spiro glycol (SPG)."

4,4'-Diphenylmethane diisocyanate is referred to as "MDI."

PRODUCTION EXAMPLE 1

Into a 3,000-ml four-necked flask equipped with a stirrer, a thermometer, and a silica gel tube were introduced 1,200 g (16.64 mol) of tetrahydrofuran and 320 g (3.72 mol) of 3-methyltetrahydrofuran. The contents were cooled to 10° C. with an ice-cooled bath. Thereto was added 53 g of 70 wt % perchloric acid using a dropping funnel. Subsequently, 187 g of acetic anhydride was added thereto using another dropping funnel over a period of about 30 minutes so as not to cause heat generation. A reaction was then allowed to proceed for 8 hours while keeping the temperature of the mixture at 15° C. After completion of the reaction, 805 g of 20 wt % aqueous sodium hydroxide solution was added to terminate the reaction. The reaction vessel was then provided with a heater and a distiller, and was gradually heated to recover the unreacted monomers by distillation. Subsequently, 900 ml of n-butanol was added to the reaction mixture to dissolve the crude poly(tetramethylene glycol). The distiller was replaced with a reflux condenser to conduct a hydrolysis reaction at 90° C. for 5 hours. After completion of the reaction, the reaction mixture was cooled to about 70° C., and stirring was stopped to allow the reaction mixture to stand. The resulting alkaline aqueous layer as the lower layer was removed. To the remaining oil layer was added 500 g of distilled water. This mixture was stirred and washed with refluxing for 30 minutes and then allowed to stand, and the resulting aqueous layer as the lower layer was removed. This water-washing operation was repeated further three times. The finally obtained oil layer was transferred to a Claisen flask equipped with a distiller, and the n-butanol as solvent and the water present in a slight amount were removed to obtain 912 g of 3 -methyltetrahydrofuran/tetrahydrofuran copolyether glycol, which was colorless and transparent. From its hydroxyl value determined by the acetylation method, $H^1$ NMR data, and DSC (Differential Scanning Calorimeter) data, this copolyether glycol was found to have a number-average molecular weight of 2,022, a 3-methyltetrahydrofuran unit/tetrahydrofuran ratio of 16/84 (by weight), and a melting point of 8° C.

PRODUCTION EXAMPLE 2

Into the same reactor as in Production Example 1 were introduced 1,200 g (16.64 mol) of tetrahydrofuran and 573 g (6.66 mol) of 3-methyltetrahydrofuran. The contents were cooled to 10° C. with an ice-cooled bath. Thereto was added 40 g of 70 wt % perchloric acid using a dropping funnel. Subsequently, 143 g of acetic anhydride was added thereto using another dropping funnel over a period of about 30 minutes so as not to cause heat generation. A reaction was then allowed to proceed for 8 hours while keeping the temperature of the mixture at 15° C. After completion of the reaction, 800 g of 20 wt % aqueous sodium hydroxide solution was added to terminate the reaction.

The subsequent procedure was carried out in the same manner as in Production Example 1 to obtain 975 g of 3 -methyltetrahydrofuran/tetrahydrofuran copolyether glycol, which was colorless and transparent.

From its hydroxyl value determined by the acetylation method, $H^1$ NMR data, and DSC data, this copolyether glycol was found to have a number-average molecular weight of 3,032, a 3-methyltetrahydrofuran unit/tetrahydrofuran ratio of 21/79 (by weight), and a melting point of 0° C.

EXAMPLE 1

Into a 1-liter four-necked separable flask equipped with a stirrer with a torque meter, a thermometer, a dropping funnel, and a nitrogen-introducing tube was introduced a 30 wt/vol % anisole solution of 4,4'-diphenylmethane diisocyanate (0.2 mol). Thereto was speedily added dropwise a 30 wt/vol % anisole solution of the PTG-L obtained in Production Example 1 (molecular weight, 2,022; 3-methyltetrahydrofuran unit content, 16% by weight; 0.1 mol) with stirring in a nitrogen atmosphere. This mixture was then heated to 80° C. and maintained at that temperature (for 10 hours) to react the ingredients to synthesize an isocyanate-terminated prepolymer.

At the time when the torque meter indicating the force required for stirring the reaction mixture had come to read a substantially constant value, a 30 wt/vol % dimethyl sulfoxide solution of spiro glycol (0.1 mol) was added dropwise to the reaction mixture with stirring at 80° C. in a nitrogen atmosphere to conduct a polyaddition reaction for about 10 hours or more.

The reaction mixture thus obtained was a colorless transparent solution. The solution obtained was poured into methanol to precipitate a polymer, which was separated by suction filtration with an aspirator. This polymer was redissolved in dimethylformamide, and an ordinary purification operation was then repeated twice. The purified polymer was dried at room temperature and a reduced pressure of about 1 mmhg for about one week, and was finally vacuum-dried at room temperature until a constant weight was reached. The polymer obtained was a substantially white powder. The yield was about 80%. This polymer had an intrinsic viscosity of about 40 g/ml. Elemental analysis data for this polymer are as follows; the found values agreed with the corresponding values calculated for the intended polymer, with the differences between the found and calculated values being within an error range.

Calculated: C 66.37% H 9.75% N 1.92%

Found: C 66.46% H 9.91% N 1.87%

A graph obtained by plotting against temperature the dynamic storage modulus of this polyurethane determined by the free decay torsional vibration method is given in an accompanying drawing (FIG. 1, A).

Figure 2:
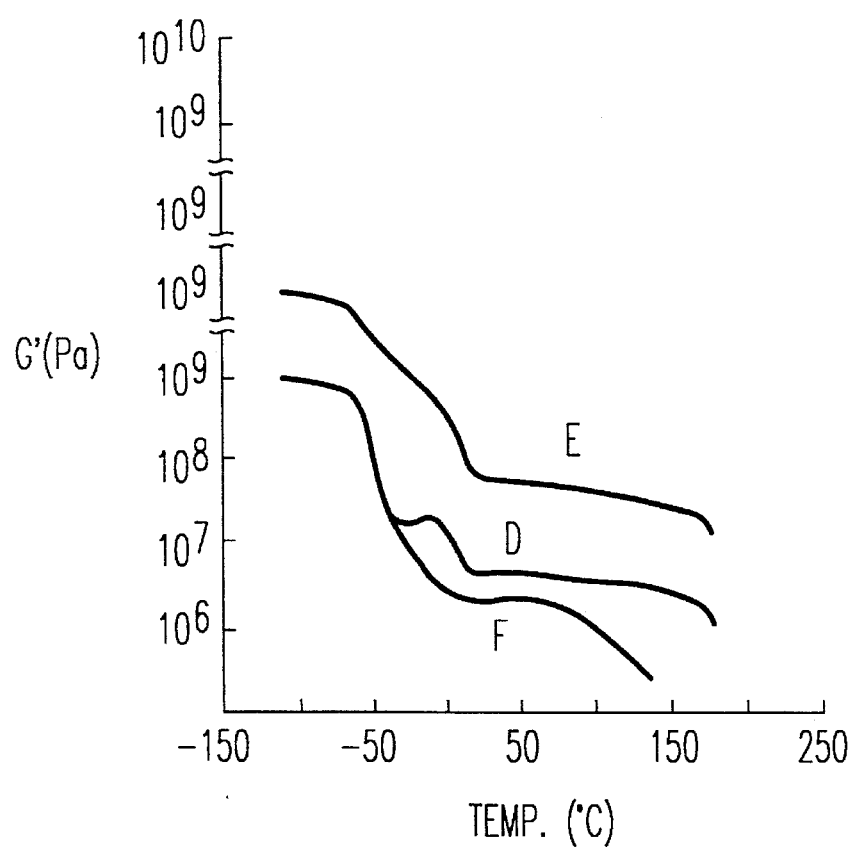
FIG. 2 shows graphs obtained by plotting the dynamic storage moduli of conventional ether-type polyurethanes against temperature.

FIG. 1 shows that this polyurethane had a modulus of elasticity as high as $8.0 \times 10^6$ Pa at a temperature as low as −50° C. and retained almost the same value of modulus even at 170° C., which was the upper limit of the temperature range used for the measurement. Namely, the polyurethane as an elastomer had exceedingly good low-temperature properties and heat resistance. Plots of the likewise measured dynamic storage moduli of representative Comparative Examples against temperature are given in FIG. 2, which Comparative Examples are a 4,4'-diphenylmethane diisocyanate/poly(oxytetramethylene diisocyanate/poly(oxytetramethylene glycol) (molecular weight, 3,010)/spiro glycol polyurethane (FIG. 2, E), and a 4,4'-diphenylmethane diisocyanate/poly(oxytetramethylene glycol) (molecular weight:about 2,004)/1,4-butanediol polyurethane (FIG. 2, F), each synthesized in the same manner as the above. These comparative polyurethanes are known thermoplastic polyurethane elastomers. As apparent from the curves, the moduli of elasticity of the polyurethanes D and E abruptly increased at about 0° C., showing that the polyurethanes had poor low-temperature properties. The modulus of elasticity of the polyurethane F began to decrease at about 60° C., showing that this polyurethane did not have significant heat resistance.

DSC data for the polyurethane obtained in this Example (FIG. 3, A) revealed that it was a thermoplastic polymer in which the soft segments had a glass transition temperature of about −75° C. and the temperature at which the polymer lost its elastomer properties and began to come into a plastic state was about 210° C., which was higher by at least about 40° C. than that of a conventional polyether polyurethane (FIG. 3, D).

EXAMPLE 1

The same procedure as in Example 1 was carried out, except that the PTG-L obtained in Production Example 2 and having a molecular weight of about 3,032 (3-methyltetrahydrofuran unit content, 21% by weight; 0.1 mol) was used in place of the PTG-L obtained in Production Example 1 and having a molecular weight of 2,022 (3-methyltetrahydrofuran unit content, 16% by weight; 0.1 mol). The polyurethane obtained also was a thermoplastic elastomer in which the soft segments had a glass transition point of about −75° C. and the temperature at which the polymer began to come into a plastic state was about 210° C. (FIG. 3, B). This polyurethane elastomer had a slightly higher modulus of elasticity than the polyurethane elastomer obtained in Example 1 and, like the polyurethane of Example 1, underwent substantially no change in modulus of elasticity over the range of from a temperature as low as −50° C. to a temperature as high as 170° C. (FIG. 1, B).

EXAMPLE 3

Into the same reactor as in Example 1 was introduced a 30 wt/vol % anisole solution of 4,4'-diphenylmethane diisocyanate (0.2 mol). Thereto was added dropwise a mixture of a 30 wt/vol % anisole solution of the PTG-L obtained in Production Example 1 and having a molecular weight of 2,022 (3methyltetrahydrofuran unit content, 16% by weight; 0.1 mol) and a 30 wt/vol % anisole solution of spiro glycol (0.1 mol) with stirring over a period of 10 minutes. The contents were then heated to 80° C. to conduct a polyaddition reaction for about 10 hours. The reaction mixture obtained was a colorless transparent liquid. This solution was treated in the same manner as in Example 1 to obtain a polymer as a substantially white powder (yield: about 80%). This polymer had an intrinsic viscosity of about 40 g/ml.

Elemental analysis data for this polymer are as follows; the found values agreed with the corresponding values calculated for the intended polymer, with the differences between the found and calculated values being within an error range.

Calculated: C 66.37% H 9.75% N 1.93%

Found: C 66.43% H 9.82% N 1.92%

This polyurethane was a thermoplastic polymer in which the soft segments had a glass transition temperature of about −76° C. and the temperature at which the polymer lost its elastomeric properties and began to come into a plastic state was about 200° C. A plot of the dynamic storage modulus of this polyurethane determined by the free decay torsional vibration method against temperature (FIG. 1, C) shows that this polyurethane, like the polyurethane elastomer of Example 1, had a substantially constant modulus of elasticity over the range of from a temperature as low as −50° C. to a temperature as high as 170° C. and was excellent in low-temperature properties and heat resistance.

The important material property which is required of elastomers such as the polyurethane of the present invention is, of course, rubber elasticity. Examples of materials which take advantage of this property include (1) various roll materials, (2) various hose materials, (3) packing materials, (4) vibration-proofing materials, (5) building materials, (6) textile materials, and (7) elastic coating materials. Since the polyurethane resin of the present invention has an almost constant modulus of elasticity over the wide temperature range of from −50° C. to about 170° C., it can exhibit elastomeric properties even in new low-temperature and high-temperature applications in which conventional elastomers have been unusable. This is an exceedingly important and useful advantage. Furthermore, the polyurethane resin of the present invention can be easily processed by injection molding or extrusion molding without the necessity of vulcanization as in conventional crosslinking-type rubbers, and this enables a scale reduction and simplification of equipment and hence attains a cost reduction. Therefore, the industrial and economical effects brought about by the present invention are also extremely significant.

While the invention has been described in detail and with reference to specific embodiments thereof, it will be apparent to one skilled in the art that various changes and modifications can be made therein without departing from the spirit and scope thereof.

What is claimed is:

1. A polyurethane resin having a broad rubbery-state region which has a number-average molecular weight of from 30,000 to 500,000 and comprises repeating units (A) represented by formula (I):

$$-CONH\text{-}X\text{-}NHCOO\text{-}Y\text{-}O- \quad (I)$$

wherein X represents the divalent residue formed by removing the isocyanate groups from an aromatic diisocyanate selected from the group consisting of p-phenylene diisocyanate, 2,4 -toluene diisocyanate, 2,6-toluene diisocyanate, 4,4' -diphenylmethane diisocyanate, 1,5-naphthalene diisocyanate, and 3,3'-dimethyldiphenyl 4,4-diisocyanate, and Y represents the divalent residue formed by removing the hydroxyl groups from a poly(alkylene ether) diol whose main chain is made up of the group represented by —CH$_2$CH$_2$CH$_2$CH$_2$O— and a group represented by —CHR$_1$CHR$_2$CHR$_3$CHR$_4$O— where one of R$_1$, R$_2$, R$_3$, and R$_4$ is a lower alkyl group and the remaining three each is a hydrogen atom, and which has a number-average molecular weight of from 500 to 10,000), and repeating units (B) represented by formula (II):

$$-CONH\text{-}X\text{-}NHCOO\text{-}Z\text{-}O- \quad (II)$$

wherein X represents the divalent residue formed by removing the isocyanate groups from an aromatic diisocyanate selected from the group consisting of p-phenylene diisocyanate, 2,4 -toluene diisocyanate, 2,6-toluene diisocyanate, 4,4' -diphenylmethane diisocyanate, 1,5-naphthalene diisocyanate, and 3,3'-dimethyldiphenyl 4,4-diisocyanate, and Z represents the divalent residue formed by removing the hydroxyl groups from 3,9-bis(1,1-dimethyl-2-hydroxyethyl)-2,4,8,10 -tetraoxaspiro[5,5]undecane), the repeating units (A) and (B) being bonded together in a random sequence, with the proportion of (A)/(B) being from 0.1 to 2.0.

2. The polyurethane resin of claim 1, which comprises repeating units (A) represented by formula (I):

$$-CONH\text{-}X\text{-}NHCOO\text{-}Y\text{-}O- \quad (I)$$

wherein X represents the divalent residue formed by removing the isocyanate groups from 4,4'-diphenylmethane diisocyanate and Y represents the divalent residue formed by removing the hydroxyl groups from a poly(alkylene ether) diol whose main chain is made up of the group represented by —CH$_2$CH$_2$CH$_2$CH$_2$O— and a group represented by —CH$_2$CHR$_2$CHR$_3$CH$_2$O— where either of R$_2$ and R$_3$ is a methyl group and the remaining one is a hydrogen atom, and which has a number-average molecular weight of 500 to 10,000, and repeating units (B) represented by formula (II):

$$-CONH\text{-}X\text{-}NHCOO\text{-}Z\text{-}O- \quad (II)$$

wherein X represents the divalent residue formed by removing the isocyanate groups from 4,4'-diphenylmethane diisocyanate and Z represents the divalent residue formed by removing the hydroxyl groups from 3,9-bis(1,1-dimethyl-2-hydroxyethyl)- 2,4,8,10-tetraoxaspiro[5,5]undecane).

3. A process for producing a polyurethane resin having a broad rubbery-state region which has a number-average molecular weight of from 30,000 to 500,000 and comprises repeating units (A) represented by formula (I):

—CONH-X-NHCOO-Y-O—      (I)

wherein X represents the divalent residue formed by removing the isocyanate groups from an aromatic diisocyanate selected from the group consisting of p-phenylene diisocyanate, 2,4 -toluene diisocyanate, 2,6-toluene diisocyanate, 4,4' -diphenylmethane diisocyanate, 1,5-naphthalene diisocyanate, and 3,3'-dimethyldiphenyl 4,4-diisocyanate, and Y represents the divalent residue formed by removing the hydroxyl groups from a poly(alkylene ether) diol whose main chain is made up of the group represented by —CH$_2$CH$_2$CH$_2$CH$_2$O— and a group represented by —CHR$_1$CHR$_2$CHR$_3$CHR$_4$O— where one of R$_1$, R$_2$, R$_3$, and R$_4$ is a lower alkyl group and the remaining three each is a hydrogen atom, and which has a number-average molecular weight of from 500 to 10,000, and repeating units (B) represented by formula (II):

—CONH-X-NHCOO-Z-O—      (II)

wherein X represents the divalent residue formed by removing the isocyanate groups from an aromatic diisocyanate selected from the group consisting of p-phenylene diisocyanate, 2,4 -toluene diisocyanate, 2,6-toluene diisocyanate, 4,4' -diphenylmethane diisocyanate, 1,5-naphthalene diisocyanate, and 3,3'-dimethyldiphenyl 4,4-diisocyanate, and Z represents the divalent residue formed by removing the hydroxyl groups from 3,9-bis(1,1-dimethyl-2-hydroxyethyl)-2,4,8,10 -tetraoxaspiro[5,5]undecane), the repeating units (A) and (B) being bonded together in a random sequence, with the proportion of (A)/(B) being from 0.1 to 2.0, which comprises reacting an aromatic diisocyanate selected from the group consisting of p-phenylene diisocyanate, 2,4-toluene diisocyanate, 2,6-toluene diisocyanate, 4,4' -diphenylmethane diisocyanate, 1,5-naphthalene diisocyanate, and 3,3'-dimethyldiphenyl 4,4-diisocyanate with a poly(alkylene ether) diol whose main chain is made up of the group represented by —CH$_2$CH$_2$CH$_2$CH$_2$O— and a group represented by —CHR$_1$CHR$_2$CHR$_3$CHR$_4$O— where one of R$_1$, R$_2$, R$_3$, and R$_4$ is a lower alkyl group and the remaining three each is a hydrogen atom, and which has a number-average molecular weight of from 500 to 10,000 in a molar ratio (r) of (1.5-10.0):1 in an inert atmosphere either in an inert solvent or without a solvent at a temperature of from room temperature to 130° C. to form a partial prepolymer composed of components represented by formula (III) and (IV):

OCN-(-X-NHCOO-Y-O-CONH—)p-X-NCO      (III)

qx(OCN-X-NCO)      (IV)

wherein p and q each is a positive number, provided that (p+q+1)/p=r, X represents the divalent residue formed by removing the isocyanate groups from an aromatic diisocyanate selected from the group consisting of p-phenylene diisocyanate, 2,4-toluene diisocyanate, 2,6-toluene diisocyanate, 4,4' -diphenylmethane diisocyanate, 1,5-naphthalene diisocyanate, and 3,3'-dimethyldiphenyl 4,4-diisocyanate, and Y represents the divalent residue formed by removing the hydroxyl groups from a poly(alkylene ether) diol whose main chain is made up of the group represented by —CH$_2$CH$_2$CH$_2$CH$_2$O— and a group represented by —CHR$_1$CHR$_2$CHR$_3$CHR$_4$O— where one of R$_1$, R$_2$, R$_3$, and R$_4$ is a lower alkyl group and the remaining three each is a hydrogen atom, and which has a number-average molecular weight of from 500 to 10,000, and then adding 3,9-bis(1,1-dimethyl-2-hydroxyethyl)- 2,4,8,10-tetraoxaspiro[5,5]undecane to the resulting reaction system in an amount of from 0.90 to 1.10 mol per mol of the partial prepolymer composed of the components represented by formulae (III) and (IV) to conduct a polyaddition reaction in an inert atmosphere.

4. A process for producing a polyurethane resin having a broad rubbery-state region which has a number-average molecular weight of from 30,000 to 500,000 and comprises repeating units (A) represented by formula (I):

—CONH-X-NHCOO-Y-O—      (I)

wherein X represents the divalent residue formed by removing the isocyanate groups from an aromatic diisocyanate selected from the group consisting of p-phenylene diisocyanate, 2,4 -toluene diisocyanate, 2,6-toluene diisocyanate, 4,4' -diphenylmethane diisocyanate, 1,5-naphthalene diisocyanate, and 3,3'-dimethyldiphenyl 4,4-diisocyanate, and Y represents the divalent residue formed by removing the hydroxyl groups from a poly(alkylene ether) diol whose main chain is made up of the group represented by —CH$_2$CH$_2$CH$_2$CH$_2$O— and a group represented by —CHR$_1$CHR$_2$CHR$_3$CHR$_4$O— where one of R$_1$, R$_2$, R$_3$, and R$_4$ is a lower alkyl group and the remaining three each is a hydrogen atom, and which has a number-average molecular weight of from 500 to 10,000, and repeating units (B) represented by formula (II):

—CONH-X-NHCOO-Z-O—      (II)

wherein X represents the divalent residue formed by removing the isocyanate groups from an aromatic diisocyanate selected from the group consisting of p-phenylene diisocyanate, 2,4 -toluene diisocyanate, 2,6-toluene diisocyanate, 4,4' -diphenylmethane diisocyanate, 1,5-naphthalene diisocyanate, and 3,3'-dimethyldiphenyl 4,4-diisocyanate, and Z represents the divalent residue formed by removing the hydroxyl groups from 3,9-bis(1,1-dimethyl-2-hydroxyethyl)-2,4,8,10 -tetraoxaspiro[5,5]undecane), the repeating units (A) and (B) being bonded together in a random sequence, with the proportion of (A)/(B) being from 0.1 to 2.0, which comprises polyaddition reacting (a) an aromatic diisocyanate selected from the group consisting of p-phenylene diisocyanate, 2,4-toluene diisocyanate, 2,6-toluene diisocyanate, 4,4'-diphenylmethane diisocyanate, 1,5 -naphthalene diisocyanate, and 3,3'-dimethyldiphenyl 4,4 -diisocyanate with (b) a poly(alkylene ether) diol whose main chain is made up of the group represented by —CH$_2$CH$_2$CH$_2$CH$_2$O— and a group represented by —CHR$_1$CHR$_2$CHR$_3$CHR$_4$O— where one of R$_1$, R$_2$, R$_3$, and R$_4$ is a lower alkyl group and the remaining three each is a hydrogen atom, and which has a number-average molecular weight of from 500 to 10,000 and (c) 3,9-bis(1,1-dimethyl-$_2$ -hydroxyethyl)-2,4,8,10-tetraoxaspiro[5,5]undecane in an (a)/{(b)+(c)} molar ratio of from 0.90 to 1.10 in an inert atmosphere either at a temperature of from room temperature to 130° C. in an inert solvent or at a temperature of from 180° to 230° C. without a solvent.

\* \* \* \* \*